United States Patent
Heo et al.

(10) Patent No.: US 10,409,430 B2
(45) Date of Patent: Sep. 10, 2019

(54) ELECTRONIC DEVICE HAVING FORCE TOUCH FUNCTION COMPRISING A DISPLAY PANEL AND A FORCE SENSING PANEL DISPOSED ENTIRELY BELOW THE DISPLAY PANEL

(71) Applicant: LG Display Co., Ltd., Seoul (KR)

(72) Inventors: JongGu Heo, Seoul (KR); JongHee Hwang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 178 days.

(21) Appl. No.: 15/198,451

(22) Filed: Jun. 30, 2016

(65) Prior Publication Data

US 2017/0003782 A1 Jan. 5, 2017

(30) Foreign Application Priority Data

Jun. 30, 2015 (KR) .................. 10-2015-0093848

(51) Int. Cl.
*G06F 3/044* (2006.01)
*G06F 3/041* (2006.01)
*F21V 8/00* (2006.01)
*G02F 1/1333* (2006.01)

(52) U.S. Cl.
CPC ........... *G06F 3/044* (2013.01); *G02B 6/0055* (2013.01); *G02F 1/13338* (2013.01); *G02F 1/133308* (2013.01); *G06F 3/041* (2013.01); *G06F 3/0412* (2013.01); *G06F 3/0414* (2013.01); *G02F 2001/133331* (2013.01); *G06F 2203/04103* (2013.01); *G06F 2203/04105* (2013.01)

(58) Field of Classification Search
CPC .......................................... G02F 2001/133331
See application file for complete search history.

(56) References Cited

U.S. PATENT DOCUMENTS

| | | | |
|---|---|---|---|
| 2008/0158817 A1* | 7/2008 | Tsunoda | G06F 1/203 361/697 |
| 2008/0222741 A1 | 9/2008 | Chinnaiyan | |
| 2010/0053854 A1 | 3/2010 | Nishikawa et al. | |
| 2010/0188607 A1 | 7/2010 | Park et al. | |
| 2010/0289771 A1 | 11/2010 | Nozawa | |
| 2011/0037726 A1 | 2/2011 | Lee | |

(Continued)

FOREIGN PATENT DOCUMENTS

| | | |
|---|---|---|
| CN | 101042499 A | 9/2007 |
| CN | 103069365 A | 4/2013 |

(Continued)

OTHER PUBLICATIONS

The State Intellectual Property Office of the People's Republic of China, First Office Action, CN Patent Application No. 201610499720.6, dated Aug. 28, 2018, 30 pages.

*Primary Examiner* — Paul C Lee
(74) *Attorney, Agent, or Firm* — Fenwick & West LLP (57) ABSTRACT

An electronic device has a force touch function which is capable of minimizing a degradation of picture quality, wherein the electronic device may include a housing having a receiving space, an image display module disposed in the receiving space, and a force sensing panel disposed between a bottom surface of the housing and the image display module, which enables a user's force touch to be sensed through the force sensing panel, and to minimize a degradation of picture quality caused by heat.

14 Claims, 5 Drawing Sheets

(56) References Cited

U.S. PATENT DOCUMENTS

| | | |
|---|---|---|
| 2011/0115738 A1 | 5/2011 | Suzuki et al. |
| 2012/0068965 A1 | 3/2012 | Wada et al. |
| 2012/0162546 A1* | 6/2012 | Shimomichi .......... H04N 5/645 |
| | | 348/794 |
| 2013/0082970 A1 | 4/2013 | Frey et al. |
| 2013/0285977 A1 | 10/2013 | Baharav et al. |
| 2014/0029295 A1* | 1/2014 | Hsiao ................... G02B 6/0011 |
| | | 362/606 |
| 2014/0253305 A1* | 9/2014 | Rosenberg .............. G06F 3/016 |
| | | 340/407.2 |
| 2016/0062500 A1* | 3/2016 | Kessler ................ G06F 3/0414 |
| | | 345/174 |
| 2016/0132166 A1 | 5/2016 | Kim et al. |
| 2016/0224168 A1 | 8/2016 | Watanabe et al. |

FOREIGN PATENT DOCUMENTS

| | | |
|---|---|---|
| CN | 104487923 A | 4/2015 |
| CN | 204331668 U | 5/2015 |
| EP | 1983411 A1 | 10/2008 |
| EP | 2214050 | 8/2010 |
| EP | 2221712 | 8/2010 |
| EP | 2333645 A1 | 6/2011 |
| KR | 10-2013-0015584 | 2/2013 |
| WO | WO 2015/041163 A1 | 3/2015 |

\* cited by examiner

ELECTRONIC DEVICE HAVING FORCE TOUCH FUNCTION COMPRISING A DISPLAY PANEL AND A FORCE SENSING PANEL DISPOSED ENTIRELY BELOW THE DISPLAY PANEL

CROSS REFERENCE TO RELATED APPLICATIONS

This application claims the benefit of the Korean Patent Application No. 10-2015-0093848 filed on Jun. 30, 2015, which is hereby incorporated by reference as if fully set forth herein.

BACKGROUND

Field of the Disclosure

The present disclosure relates to an electronic device having a force touch function. In the present disclosure, a device having a force touch function may be a device which is operable to sense a force of a user's touch.

Discussion of the Related Art

A touch screen device is a type of input device that allows a user to input information through a screen contact of a display device without an additional input device in electronic devices. The touch screen device is generally used as the input device for various kinds of products such as television, notebook computer and monitor as well as portable electronic devices such as electronic notebook, electronic book (e-book), PMP (Portable Multimedia Player), navigation, UMPC (Ultra Mobile PC), mobile phone, smart phone, smart watch, tablet PC (tablet Personal Computer), watch phone, and mobile communication terminal.

Recently, with an establishment of a user interface environment such as application which requires touch information for a force touch, an electronic device having a force touch function for sensing a force touch has been developed and studied.

Figure 1:
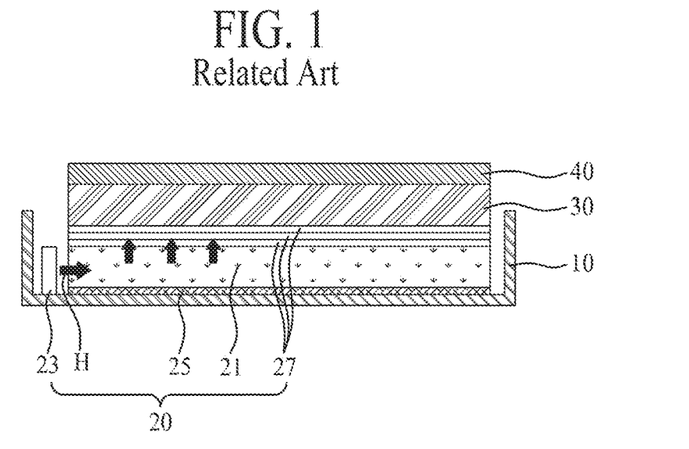
FIG. 1 illustrates a related art electronic device having a force touch function.

FIG. 1 illustrates a related art electronic device having a force touch function.

Referring to FIG. 1, the related art electronic device having a force touch function may include a support cover 10 having a receiving space, a backlight unit 20 received in the receiving space, a liquid crystal display panel 30 disposed on the backlight unit 20, and a force sensing panel 40 disposed on the liquid crystal display panel 30.

The backlight unit 20 may include a light guiding plate 21 disposed at a rear surface of the liquid crystal display panel 30, a light source 23 for emitting light to a light-incidence portion disposed at a lateral side of the light guiding plate 21, a reflective sheet 25 disposed between a rear surface of the light guiding plate 21 and a bottom surface of the support cover 10, and optical sheets 27 disposed on the light guiding plate 21.

The liquid crystal display panel 30 displays an image by the use of light emitted from the backlight unit 20 in accordance with light-transmittance properties by an alignment of liquid crystal. The liquid crystal display panel 30 may include pixel and common electrodes of forming an electric field for the alignment of liquid crystal. In this case, the common electrode is used as a touch electrode for sensing a user's touch position in a touch sensing mode, and is also used as a liquid crystal driving electrode in a display mode. This liquid crystal display panel 30 may be an in-cell touch type liquid crystal display panel.

The force sensing panel 40 may include force sensing electrodes for sensing a force touch on a user's touch.

The related art electronic device having a force touch function senses a touch position and a force touch in response to a user's touch, and performs an application corresponding to the sensed touch position and/or force touch.

In the related art electronic device having a force touch function, heat is generated in accordance with a driving of the light source 23, for example, a light emitting diode array, and then the generated heat radiates toward the support cover 10 of a metal material through the reflective sheet 25. However, the heat generated from the light source 23 remains inside the electronic device instead of being released toward the support cover 10. As a result, a picture quality may be degraded due to wrinkles in the optical sheets 27 due to the remaining heat. Moreover, deterioration of the liquid crystal can occur due to the remaining heat.

The above description for the related art is technical information which is held by an inventor of the present application. This is not a prior art disclosed to the general public before the priority date of the present application.

SUMMARY

There is provided an electronic device having a force touch function that substantially obviates one or more problems due to limitations and disadvantages of the related art.

There is provided an electronic device having a force touch function which is capable of minimizing degradation of picture quality caused by heat.

There is provided an electronic device having a force touch function which is capable of improving heat-radiation efficiency and capable of preventing an image display module from being damaged by an external shock.

Additional advantages and features of embodiments disclosed herein will be set forth in part in the description which follows and in part will become apparent to those having ordinary skill in the art upon examination of the following or may be learned from practice of embodiments disclosed herein. The objectives and other advantages of embodiments disclosed herein may be realized and attained by the structure particularly pointed out in the written description and claims hereof as well as the appended drawings.

To achieve these and other advantages and in accordance with the purpose of embodiments as broadly described herein, there is provided an electronic device having a force touch function that may include a housing with a receiving space, an image display module disposed in the receiving space, and a force sensing panel disposed between a bottom surface of the housing and the image display module. The receiving space may be defined by a bottom surface and a sidewall of the housing.

The electronic device having a force touch function may further include a radiation member disposed between the bottom surface of the housing and the force sensing panel.

In one or more embodiments, an electronic device operable to sense an amount of force of a touch is provided. The electronic device comprises a display panel to display an image and to receive the touch, a planar surface comprising metal for dissipating heat, and a force sensing panel disposed between the display panel and the planar surface. The force sensing panel may be configured to receive the touch through the display panel.

In one or more embodiments, the force sensing panel is configured to transfer the heat generated from the display panel to the planar surface.

In one or more embodiments, the force sensing panel includes a force sensor. The force sensing panel may determine the amount of the force of the touch according to a resistance value of the force sensor.

In one or more embodiments, the force sensing panel includes a first electrode, a second electrode, and an elastic resistor member between the first electrode and the second electrode. A resistance of the elastic resistor member may be determined according to a current through the first electrode, the elastic resistor member, and the second electrode to determine the amount of the force of the touch.

In one or more embodiments, the electronic device further comprises a radiation member between the planar surface and the force sensing panel to improve heat-radiation efficiency.

In one or more embodiments, a surface of the force sensing panel facing the planar surface is coated with a radiation member to improve heat-radiation efficiency.

It is to be understood that both the foregoing general description and the following detailed description of embodiments are exemplary and explanatory and are intended to provide further explanation of the invention as claimed.

BRIEF DESCRIPTION OF THE DRAWINGS

The accompanying drawings, which are included to provide a further understanding of the present disclosure and are incorporated in and constitute a part of this application, illustrate embodiments and together with the description serve to explain the principle of the present disclosure. In the drawings.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements. The terms "prepared" and "provided" may be used to mean "disposed", "positioned", or "formed". For example, the terms "prepared on", "prepared in", or "provided on" may be used to mean "disposed on", "positioned on", "formed in", or "formed on"; the term "prepared between" may be used to mean "disposed between", "positioned between", or "formed between"; and the term "prepared along" may be used to mean "disposed along", "positioned along", or "formed along".

Hereinafter, an electronic device having a force touch function according to the embodiment will be described in detail with reference to the accompanying drawings. Wherever possible, the same reference numbers will be used throughout the drawings to refer to the same or like parts. Also, in the following description, if detailed description of elements or functions known in respect of the present disclosure is determined to make the subject matter of the present disclosure unnecessarily obscure, the detailed description will be omitted.

Figure 2:
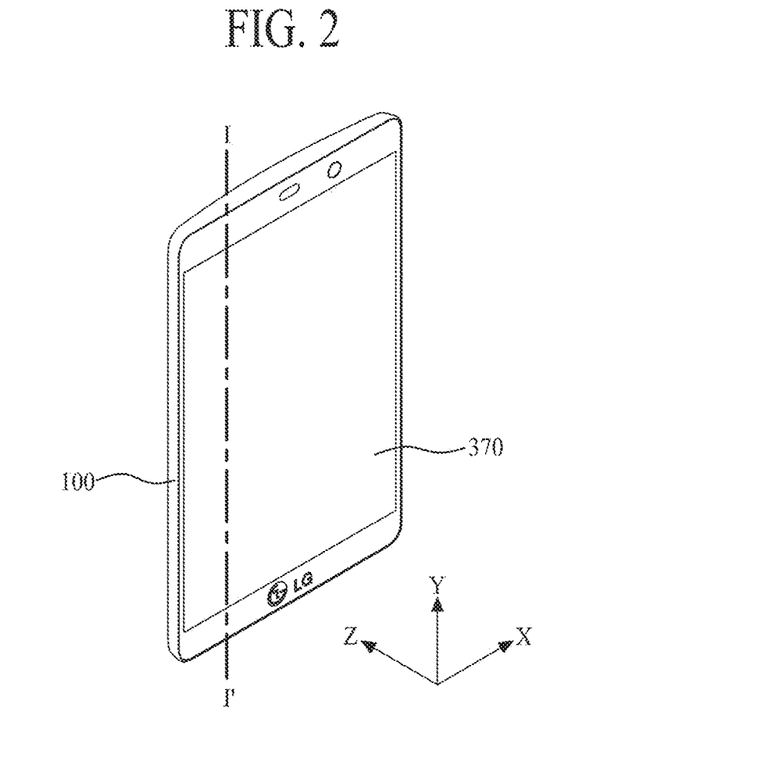
FIG. 2 is a perspective view illustrating an electronic device having a force touch function according to one embodiment.
Figure 3:
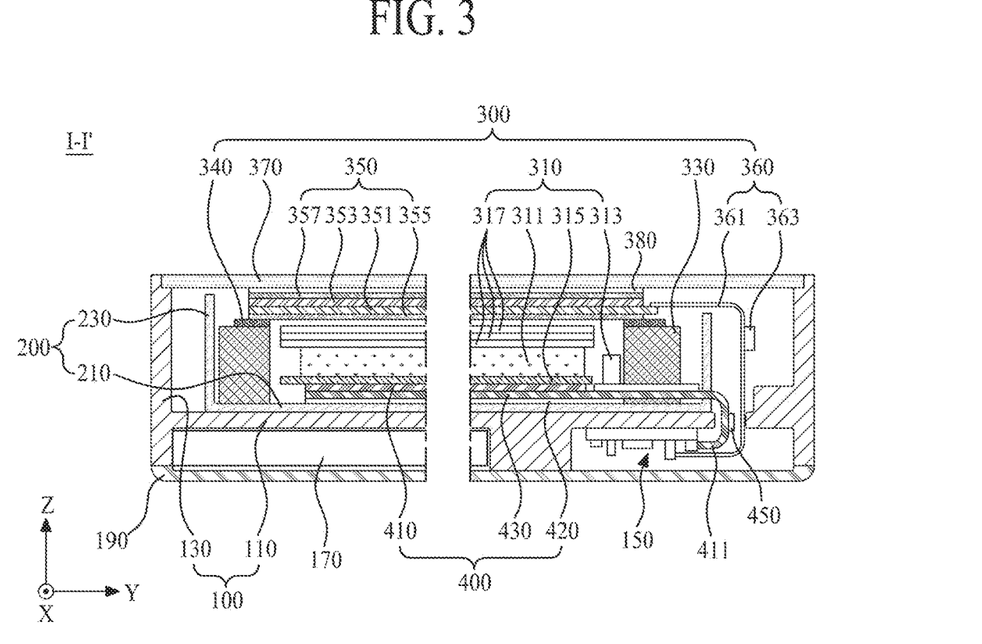
FIG. 3 is a cross sectional view along I-I' of FIG. 2.

FIG. 2 is a perspective view illustrating an electronic device having a force touch function (hereinafter, referred to as "electronic device") according to one embodiment, and FIG. 3 is a cross sectional view along I-I' of FIG. 2.

Referring to FIGS. 2 and 3, the electronic device according to one embodiment may include a housing 100, a support cover 200, an image display module 300, and a force sensing panel 400.

The housing 100 has a receiving space defined by a bottom surface 110 and a housing sidewall 130. That is, the housing 100 may be formed in a case shape whose upper surface is opened. The bottom surface 110 may be a generally planar surface. The housing 100 may be formed of a metal material or a plastic material. For example, the housing 100 may include a metal material of a magnesium (Mg) material, an aluminum (Al) material, or an invar material.

The receiving space is disposed on the bottom surface 110 of the housing 100. The support cover 200, the force sensing panel 400 and the image display module 300 are received in the receiving space.

At least one of system receiving space may be disposed in a rear surface of the housing 100. In the system receiving space, there are a system driving circuit 150 of the electronic device, a battery 170 for supplying a driving power, a communication module (not shown), a power circuit (not shown), and a memory (not shown). This rear surface of the housing 100 is covered by a rear cover 190. For replacement of the battery 170, the rear cover 190 may be detachable from the rear surface of the housing 100. If using the electronic device with the internal-type battery 170, the rear cover 190 may be permanently fixed to the rear surface of the housing 100.

The support cover 200 has a support space defined by a support plate 210 and a sidewall 230. The support cover 200, which is formed in a case shape whose upper surface is opened, supports the force sensing panel 400 and the image display module 300. The support cover 200 emits radiation of heat transferred via the force sensing panel 400. To this end, the support cover 200 may include a metal material for a rapid radiation of heat generated in the image display module 300, for example, an aluminum (Al) material, an invar material, or a magnesium (Mg) material.

The image display module 300 is a hardware component that displays an image corresponding to a video signal supplied from the system driving circuit 150, or senses a touch position for a user's touch. For a display mode, the image display module 300 displays an image corresponding to a video signal supplied from the system driving circuit 150. For a touch sensing mode, the image display module 300 senses a touch position for a user's touch, and provides the sensed touch position to the system driving circuit 150.

The image display module 300 according to an example may include a backlight unit 310, a guide frame 330, a liquid crystal display panel 350, and a cover window 370.

The backlight unit 310 may include a light guiding plate 311, a light source 313, a reflective sheet 315, and optical sheets 317.

The light guiding plate 311 is formed in a quadrangle plate shape including a light-incidence portion disposed on at least any one side thereof. The light guiding plate 311 includes an optical pattern (not shown) which advances light, which is incident on the light-incidence portion, toward an upper direction, that is, toward the liquid crystal display panel 350.

The light source 313, which faces the light-incidence portion of the light guiding plate 311, is provided at a lateral side of the light guiding plate 311. The light source 313 emits light to the light-incidence portion of the light guiding plate 311. The light source 313 according to an embodiment may include a light emitting diode array with a plurality of light emitting diode packages. The light emitting diode array may include a printed circuit board disposed close to the light-incidence portion of the light guiding plate 311, and the plurality of light emitting diode packages mounted on the printed circuit board. In this case, the printed circuit board is a flexible circuit board, and the printed circuit board includes a power line for supplying a driving power to the plurality of light emitting diode packages. Each of the plurality of light emitting diode packages may include a light emitting diode chip, and a wavelength conversion layer for covering the light emitting diode chip. The plurality of light emitting diode packages transmit a white light to the light guiding plate 311, wherein the white light may be obtained by mixing a first color light, which is emitted from the light emitting diode chip in accordance with a driving power supplied through a power line, with a second color light whose wavelength is converted from the first color light by the wavelength conversion layer.

The reflective sheet 315 is provided to cover a rear surface of the light guiding plate 311. That is, the reflective sheet 315 is interposed between the light guiding plate 311 and the support plate 210 of the support cover 200. In more detail, the reflective sheet 315 is disposed between the light guiding plate 311 and the force sensing panel 400. The reflective sheet 315 reflects light, which is incident through a lower surface of the light guiding plate 311, to the inside of the light guiding plate 311, thereby minimizing a light loss. Also, the reflective sheet 315 emits radiation of heat, which is generated in the light guiding plate 311 by heat and light generated for driving the light source 313, toward the support cover 200.

The optical sheets 317 are disposed on the light guiding plate 311, wherein the optical sheets 317 improve luminance properties of the light guided by the light guiding plate 311. For example, the optical sheets 317 may include a lower diffusion sheet, a prism sheet, and an upper diffusion sheet. For another example, the optical sheets 317 may be formed in a deposition structure of two or more elements selected among a diffusion sheet, a prism sheet, a dual brightness enhancement film, and a lenticular sheet.

The guide frame 330 is formed in a rectangular band shape, and the guide frame 330 is disposed on the support plate 210 of the support cover 200. The guide frame 330 supports the edge of a rear surface of the liquid crystal display panel 350. The guide frame 330 surrounds each lateral surface of the backlight unit 310, to thereby minimize a movement of the backlight unit 310. Herein, lateral sides of the guide frame 330 are surrounded by the sidewall 230 of the support cover 200.

The guide frame 330 is physically connected with the edge of the rear surface of the liquid crystal display panel 350 through a panel adhesion member 340. In this case, the panel adhesion member 340 may be a double-sided tape, a thermal-curing resin, a photo-curing resin, or a double-sided adhesive foam pad.

The liquid crystal display panel 350 may include a lower substrate 351, an upper substrate 353, and a liquid crystal layer interposed between the lower substrate 351 and the upper substrate 353. The liquid crystal display panel 350 displays a predetermined image by the use of light emitted from the backlight unit 310.

The lower substrate 351 is a thin film transistor array substrate. The lower substrate 351 may include a plurality of pixels (not shown) provided every pixel region defined by crossing a plurality of gate lines (not shown) and a plurality of data lines (not shown). Each pixel may include a thin film transistor (not shown) connected with the gate and data lines, a pixel electrode connected with the thin film transistor, and a common electrode provided close to the pixel electrode and supplied with a common voltage.

A pad (not shown), which is connected with each signal line, is formed in a lower edge of the lower substrate 351. The pad is connected with the panel driving circuit 360. Also, a gate driving circuit (not shown) for supplying a gate signal to the gate line of the liquid crystal display panel 350 may be formed in a left and/or right edge of the lower substrate 351. In this case, the gate driving circuit is connected with each gate line, and is manufactured for a process of forming the thin film transistor of each pixel.

The upper substrate 353 may include a pixel-defining pattern for defining an opening region overlapped with each pixel region of the lower substrate 351, and a color filter provided in the opening region. The upper substrate 353, which confronts the lower substrate 351, is bonded to the lower substrate 351 by the use of sealant, wherein the liquid crystal layer is interposed between the lower substrate 351 and the upper substrate 353. Accordingly, an entire area of the lower substrate 351 except the pad is covered by the upper substrate 353.

An alignment film (not shown) for aligning a pretilt angle of liquid crystal is provided on at least any one of the lower substrate 351 and the upper substrate 353. The liquid crystal layer is interposed between the lower substrate 351 and the upper substrate 353. The liquid crystal layer includes liquid crystal molecules which are horizontally aligned in an in-plane mode electric field formed by common and data voltages applied to the pixel electrode every pixel.

A lower polarizing member 355 having a first polarizing axis is attached to a rear surface of the lower substrate 351, and an upper polarizing member 357 having a second polarizing axis which is perpendicular to the first polarizing axis is attached to a front surface of the upper substrate 353.

For the touch sensing mode, the common electrode is used as a touch sensing electrode in the liquid crystal display panel 350. For the display mode, the common electrode together with the pixel electrode is used as a liquid crystal driving electrode in the liquid crystal display panel 350. That is, the liquid crystal display panel 350 may be an in-cell touch type liquid crystal display panel, and more particularly, a self capacitive in-cell touch type liquid crystal display panel. For example, the in-cell touch type liquid crystal display panel may be a liquid crystal display panel in a liquid crystal display device with a touch sensor, which is disclosed in Korean Patent Publication Number 10-2013-0015584.

As the panel driving circuit 360 is electrically connected with the pad of the lower substrate 351, each pixel of the liquid crystal display panel 350 is driven so that a predetermined color image is displayed on the liquid crystal display panel 350. The panel driving circuit 360 according to one example of the present disclosure may include a flexible circuit film 361, and a display driving integrated circuit 363.

The flexible circuit film 361 is connected with the pad of the lower substrate 351, and is also connected with the system driving circuit 150. The flexible circuit film 361 is an interface between the display driving integrated circuit 363 and the system driving circuit 150, and transmits a signal output from the display driving integrated circuit 363 to the pad.

For the display mode, the display driving integrated circuit 363 drives each pixel by the use of control signal and video data supplied from the system driving circuit 150. For the touch sensing mode, the display driving integrated circuit 363 supplies a touch driving pulse to the common electrode through a touch driving line, senses a change of capacitance in the common electrode in accordance with a user's touch through the touch driving line, generates touch position data based on the sensed change of capacitance, and provides the generated touch position data to the system driving circuit 150.

Additionally, the liquid crystal display panel 350 may further include a load offset wiring overlapped with the gate line and/or data line and overlapped with the common electrode. The load offset wiring is connected with the display driving integrated circuit 363 through the pad. For the touch sensing mode, the display driving integrated circuit 363 applies the touch driving pulse to the common electrode through the touch driving line, and synchronously supplies a load offset pulse corresponding to the touch driving pulse to the load offset wiring. Accordingly, it is possible to reduce noise for the touch position sensing time based on the change of capacitance in the common electrode, and thus to improve sensitivity to the touch position sensing.

The cover window 370, which covers an entire front surface of the liquid crystal display panel 350, is supported by the housing sidewall 130 of the housing 100. In this case, the cover window 370 is physically attached to the entire front surface of the liquid crystal display panel 350 by the use of transparent adhesive 380, for example, OCA (Optical Clear Adhesive) or OCR (Optical Clear Resin), to thereby protect the liquid crystal display panel 350 from an external impact. The cover window 370 may be formed of a tempered glass, a transparent plastic, or a transparent film. According to an example, the cover window 370 may include at least any one of sapphire glass and gorilla glass. According to another example, the cover window 370 may include any one among PET (polyethyleneterephthalate), PC (polycarbonate), PES (polyethersulfone), PEN (polyethylenapthanate), and PNB (polynorborneen). In consideration of scratches and transparency, the cover window 370 may include the tempered glass, preferably.

The force sensing panel 400 is interposed between the support plate 210 of the support cover 200 and the reflective sheet 315 of the backlight unit 310, wherein the force sensing panel 400 senses a force touch of a user's touch (i.e., senses an amount of force of the touch). Also, the force sensing panel 400 serves as a heat transfer medium for transferring the heat generated in the light source 313 of the backlight unit 310 to the support cover 200 so that it is possible to distribute the residual heat, which remains inside the electronic device, to thereby overcome a problem of inferior picture quality caused by the heat generated in the light source 313. In this case, the heat of the reflective sheet 315 may radiate toward the support cover 200 along a heat transfer path via a contact portion of the force sensing panel 400 being in a physical contact with the reflective sheet 315 and the support cover 200, and the heat of the reflective sheet 315 may radiate toward the support cover 200 through a heat radiation of the force sensing panel 400 at the same time.

Figure 4:
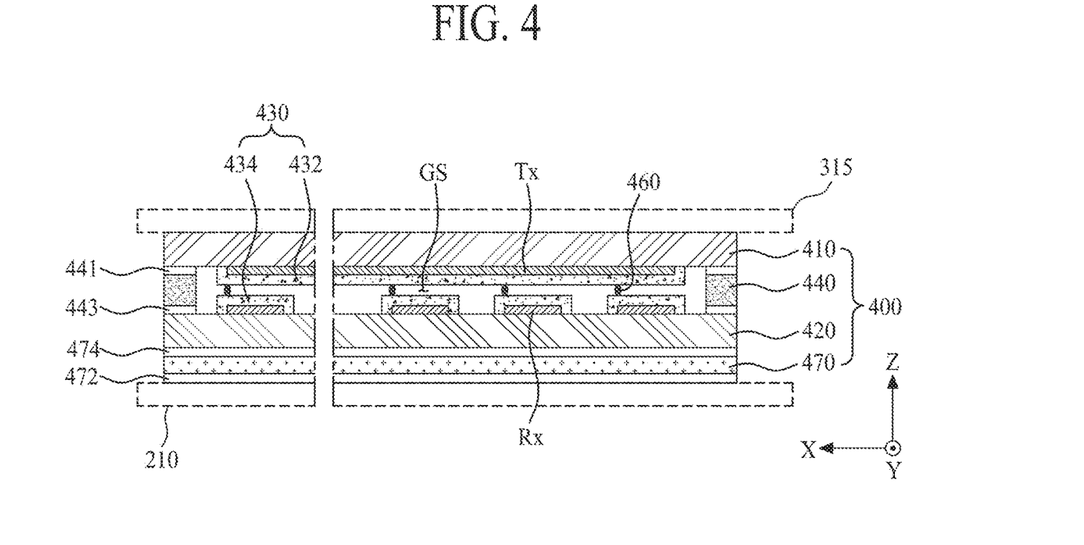
FIG. 4 is a cross sectional view illustrating a force sensing panel shown in FIG. 3.

The force sensing panel 400, according to one example of the present disclosure, may include a force sensor whose resistance value is changed in accordance with a user's force touch, wherein the force sensor may be provided between first and second electrodes facing each other. As shown in FIG. 4, the force sensing panel 400 according to one example of the present disclosure may include a first substrate 410, a second substrate 420, an elastic resistor member 430, and a substrate attachment member 440.

The first substrate 410 is disposed below the reflective sheet 315 of the backlight unit 310, wherein the first substrate 410 includes a plurality of first electrodes (Tx) arranged at fixed intervals in parallel. As one possibility, the plurality of first electrodes (Tx) are carried on the first substrate 410 such that the plurality of first electrodes (Tx) are disposed on the first substrate 410. The first substrate 410 transfers the heat from the reflective sheet 315 toward the support cover 200.

The second substrate 420 is disposed below the first substrate 410, wherein the second substrate 420 includes a plurality of second electrodes (Rx) arranged at fixed intervals in parallel and provided to cross the plurality of first electrodes (Tx). As one possibility, the plurality of second electrodes (Rx) are carried on the second substrate 420 such that the plurality of second electrodes (Rx) are disposed on the second substrate 420.

The first and second substrates 410 and 420 may be formed of PET (polyethyleneterephthalate) material.

Figure 5:
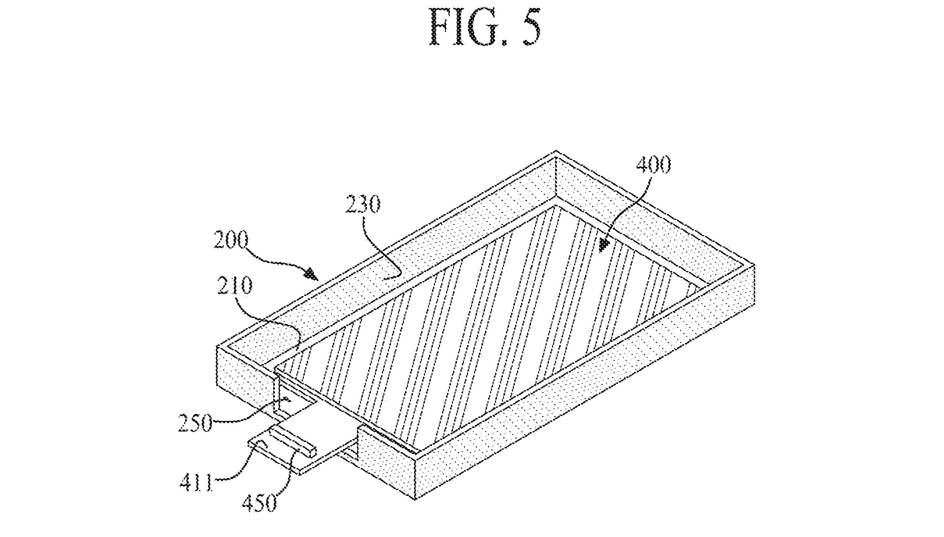
FIG. 5 illustrates a support cover and a circuit connector in the electronic device of FIG. 3.

The first substrate 410 may include a circuit connector 411, wherein the circuit connector 411 may be provided at one side of the first substrate 410. The circuit connector 411 having a predetermined width and length extends from one side of the first substrate 410. A force touch pad is formed in the circuit connector 411. The force touch pad may include a plurality of first pads which are connected with the plurality of first electrodes (Tx) in an one-to-one correspondence through a first routing wiring (not shown), and a plurality of second pads which are connected with the plurality of second electrodes (Rx) in an one-to-one correspondence through a second routing wiring (not shown). As shown in FIGS. 3 and 5, the circuit connector 411 is bent toward a rear surface of the housing 100 passing through the sidewall 230 of the support cover 200, and is then electrically connected with the system driving circuit 150. In this case, the support cover 200 may include a sidewall cut portion 250 disposed at the sidewall 230, wherein the circuit connector 411 of the force sensing panel 400 may pass through the sidewall cut portion 250 of the sidewall 230.

Referring once again to FIGS. 3 and 4, the elastic resistor member 430 is disposed between each crossing portion of the first and second electrodes (Tx, Rx). In one embodiment, the elastic resistor member 430 functions as a force sensor. Thus, a resistance value of the force sensor is changed in accordance with a user's force touch, to thereby sense a user's force touch.

The elastic resistor member 430 according to a first example may be disposed in a rear surface of the first substrate 410 facing the second substrate 420, to thereby cover the plurality of first electrodes (Tx).

The elastic resistor member 430 according to a second example may be disposed in a front surface of the second substrate 420 facing the first substrate 410, to thereby cover the plurality of second electrodes (Rx).

The elastic resistor member 430 according to the first and second examples is formed as a single body, which is appropriate for sensing a single-force touch.

The elastic resistor member 430 according to a third example may include a plurality of first elastic resistor patterns 432, and a plurality of second elastic resistor patterns 434.

The plurality of first elastic resistor patterns 432 may be disposed in a rear surface of the first substrate 410, wherein the plurality of first elastic resistor patterns 432 may cover the plurality of first electrodes (Tx) in an one-to-one correspondence. That is, one of the first elastic resistor patterns 432 is patterned in the rear surface of the first substrate 410 so as to cover one of the first electrodes (Tx).

The plurality of second elastic resistor patterns 434 may be disposed on a front surface of the second substrate 420, wherein the plurality of second elastic resistor patterns 434 may cover the plurality of second electrodes (Rx) in an one-to-one correspondence. That is, one of the second elastic resistor patterns 434 is patterned in the front surface of the second substrate 420 so as to cover one of the second electrodes (Rx).

In case of the elastic resistor member 430 according to the third example, the plurality of first elastic resistor patterns 432 are separated from one another, and the plurality of second elastic resistor patterns 434 are separated from one another, which is appropriate for sensing a multi-force touch.

The elastic resistor member 430 may be formed of a piezo-resistive based material or a pressure-sensitive adhesive material based on any one of QTC (quantum tunneling composites), EAP (electro-active polymer), and acrylic and rubber based solvent. In this case, a resistance of the pressure-sensitive adhesive material is changed according to an area of the first elastic resistor patterns 432 and the second elastic resistor patterns 434 in contact. In case of the piezo-resistive based material, if an external pressure is applied to silicon semiconductor crystals, conduction energy is generated and an electric charge is transferred to a conduction band, whereby it is possible to have a piezo-resistive effect by a change of resistivity. The resistivity is largely changed according to a size of the pressure. The elastic resistor member 430 may be coated onto the first substrate 410 and the second substrate 420 by a printing process, or may be attached to the first substrate 410 and/or the second substrate 420 by an attaching process using an adhesive.

By the substrate attachment member 440, a gap space (GS) is disposed between the first and second substrates 410 and 420, and the first and second substrates 410 and 420 facing each other are bonded to each other. The substrate attachment member 440 may be an adhesive of a cushion material. The substrate attachment member 440 structurally functions as a supporter for supporting the first substrates 410 and the second substrates 420, and functionally prevents the image display module 300 from being damaged by absorbing a strong impact from the first substrate 410.

Additionally, an upper insulating layer 441 may be provided in a contact portion of the first substrate 410 in contact with an upper surface of the substrate attachment member 440. Also, a lower insulating layer 443 may be provided in a contact portion of the second substrate 420 in contact with a lower surface of the substrate attachment member 440. The upper insulating layer 441 and lower insulating layer 443 electrically insulate the first routing wiring and the second routing wiring from each other.

A force touch driving integrated circuit 450 may be mounted in the circuit connector 411. The force touch driving integrated circuit 450 is connected with the plurality of first electrodes (Tx) through the force touch pad and the first routing wiring, and is also connected with the plurality of second electrodes (Rx) through the force touch pad and the second routing wiring. The force touch driving integrated circuit 450 generates a force sensing driving pulse, sequentially supplies the generated force sensing driving pulse to the plurality of first electrodes (Tx), senses a change of resistance value in the force sensor according to a user's force touch through the plurality of second electrodes (Rx), generates force touch data corresponding to the sensed force touch, and provides the generated force touch data to the system driving circuit 150 for sensing a force touch (i.e., sensing an amount of force of the touch). The force touch data is an electrical representation of the force touch.

In another embodiment, the force touch driving integrated circuit 450 may not be mounted on the circuit connector 411. In one example, the force touch driving integrated circuit 450 may be substituted by MCU (micro controller unit) of the system driving circuit 150.

The force sensing panel 400 according to the present disclosure may further include a spacer 460.

The spacer 460 is interposed between the first and second electrodes (Tx, Rx) facing each other, thereby maintaining the gap space (GS) between the first and second substrates 410 and 420, or restoring the first substrate 410, which is pressed by a user's force touch, to its original state. That is, the spacer 460 structurally functions as a supporter for supporting the first and second substrates 410 and 420, and functionally prevents the image display module 300 from being damaged by absorbing a strong impact from the first substrate 410. Accordingly, the force sensing panel 400 absorbs an impact applied to the image display module 300 through the spacer 460 and the substrate attachment member 440, to thereby minimize a damage of the image display module 300 by an impact.

The force sensing panel 400 is disposed between the image display module 300 and the support cover 200. The force sensing panel 400 senses a user's force touch on the image display module 300, functions as a heat transfer medium for transferring the heat generated in the light source 313 of the backlight unit 310 toward the support cover 200, and also absorbs the impact applied to the image display module 300 at the same time.

Additionally, the electronic device according to the present disclosure may further include a radiation member 470 for improving radiation efficiency through the force sensing panel 400.

The radiation member 470 according to one example may be disposed between the support plate 210 of the support cover 200 and the force sensing panel 400. For an efficient heat radiation of the reflective sheet 315, the radiation member 470 according to one example may be attached to the support plate 210 of the support cover 200 and the force sensing panel 400. That is, a rear surface of the radiation member 470 is attached to the support plate 210 of the support cover 200 by a first transparent adhesive 472, and a front surface of the radiation member 470 is attached to the second substrate 420 of the force sensing panel 400 by a second transparent adhesive 474. In this case, the first and second transparent adhesives 472 and 474 may be OCA (optical clear adhesive) or OCR (optical clear resin). The radiation member 470 according to one example may be a radiation sheet including a material with good heat resistance and heat radiation, for example, carbon fiber, acrylic elastomer, graphite or silicone/ceramic. Preferably, the radiation member 470 includes graphite.

The radiation member 470 according to another example may be coated onto the second substrate 420 of the force sensing panel 400 facing the support plate 210 of the support cover 200. For an efficient heat radiation of the reflective sheet 315, the radiation member 470 according to another example may be attached to the support plate 210 of the support cover 200. That is, the radiation member 470 according to another example is coated onto a rear surface of the second substrate 420 of the force sensing panel 400, and is attached to the support plate 210 of the support cover 200 by the transparent adhesive 472. The radiation member 470 according to another example may include carbon fiber, acrylic elastomer, graphite or silicone/ceramic, and a thickness of the radiation member 470 may be the same as or less than a half of a thickness of the second substrate 420.

Figure 6:
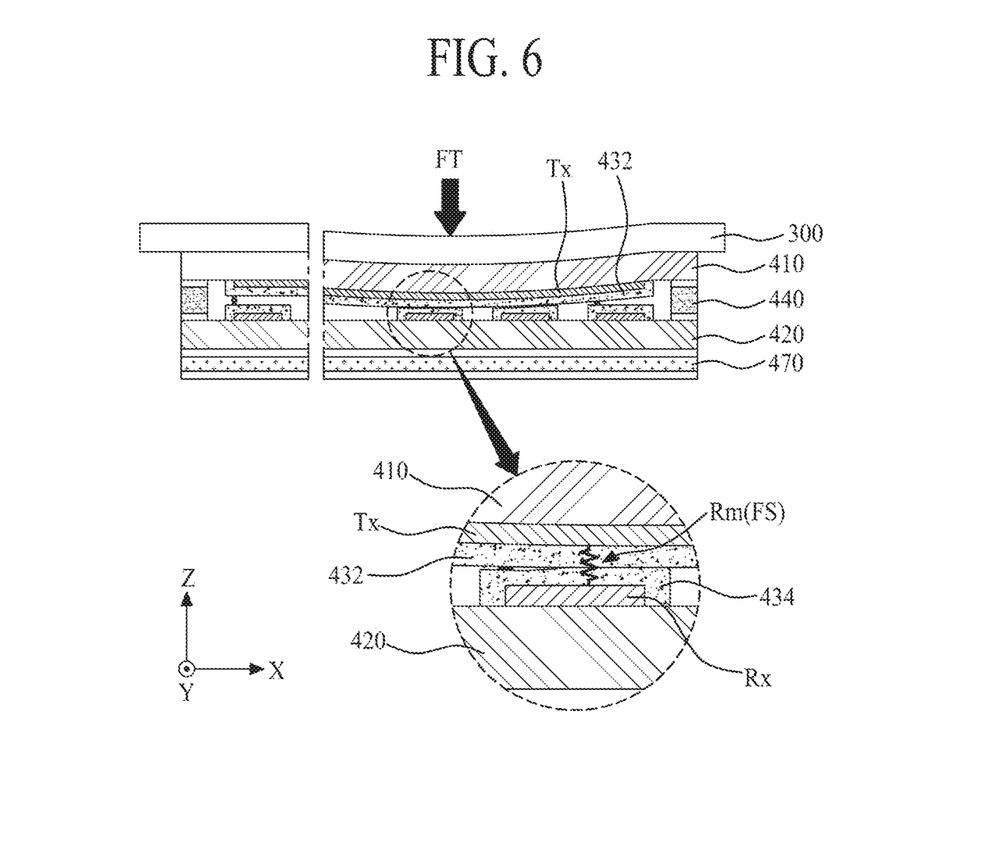
FIG. 6 illustrates a force touch sensing process in the electronic device according to one embodiment.

FIG. 6 illustrates a force touch sensing process in the electronic device according to one embodiment.

The force touch sensing process will be described in detail with reference to FIG. 6.

First, if a user's force touch (FT) applied to the image display module 300 is the same as or more than a reference pressure level, the force sensing panel 400 is pressed so that the first elastic resistor pattern 432 for covering the first electrode (Tx) is physically brought into contact with the second elastic resistor pattern 434 for covering the second electrode (Rx). Because the first and second electrodes (Tx, Rx) are in a conduction state by the elastic resistor member 430 at a time point of contact between the first and second elastic resistor patterns 432 and 434 in accordance with a user's force touch (FT), a current flows between the first and second electrodes (Tx, Rx) of the conduction state, and the current flow is formed in the force sensor (FS). The current flow can indicate the force touch. That is, if the first and second elastic resistor patterns 432 and 434 are brought into contact with each other, the first and second electrodes (Tx, Rx) facing each other are electrically connected with each other through the elastic resistor member 430, whereby a resistance (Rm) is formed between the first and second electrodes (Tx, Rx). Thus, the force touch can be detected.

The force touch data is generated by sensing the change of resistance value (Rm) formed in the force sensor (FS) in accordance with the force touch event. That is, in case of occurrence of the force touch event, an analog force sensing signal is generated by amplifying a sensing voltage in accordance with the change of resistance value of the force sensor (FS) through the second electrode (Rx), and then the analog force sensing signal is converted into a digital signal, to thereby generate the force touch data, for example, presented in a digital representation. In this case, the sensing voltage may be amplified by an inverting amplifier.

Figure 7:
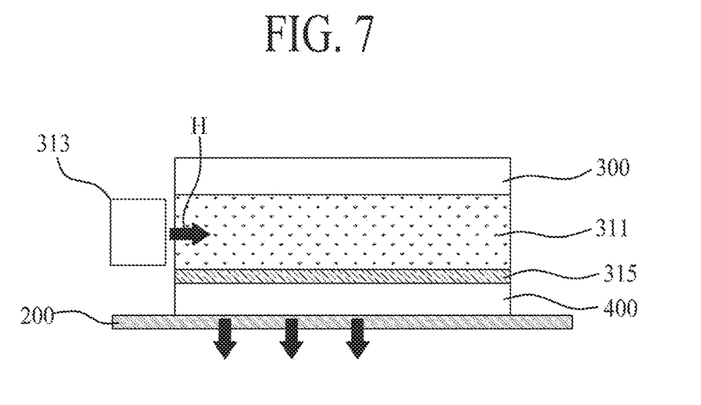
FIG. 7 illustrates a heat radiation through the force sensing panel in the electronic device according to one embodiment.

In case of the electronic device according to one embodiment, the impact applied to the image display module 300 is absorbed by the force sensing panel 400 disposed between the image display module 300 and the support cover 200 so that it is possible to minimize a damage of the image display module 300 by the impact. Especially, in case of the electronic device according to one embodiment, as shown in FIG. 7, the heat (H) generated in the light source 313 of the backlight unit 310 radiates toward the support cover 200 through the reflective sheet 315 and the force sensing panel 400 so that it is possible to minimize a degradation of picture quality caused by deterioration of liquid crystal and wrinkles in the optical sheets 317.

Figure 8:
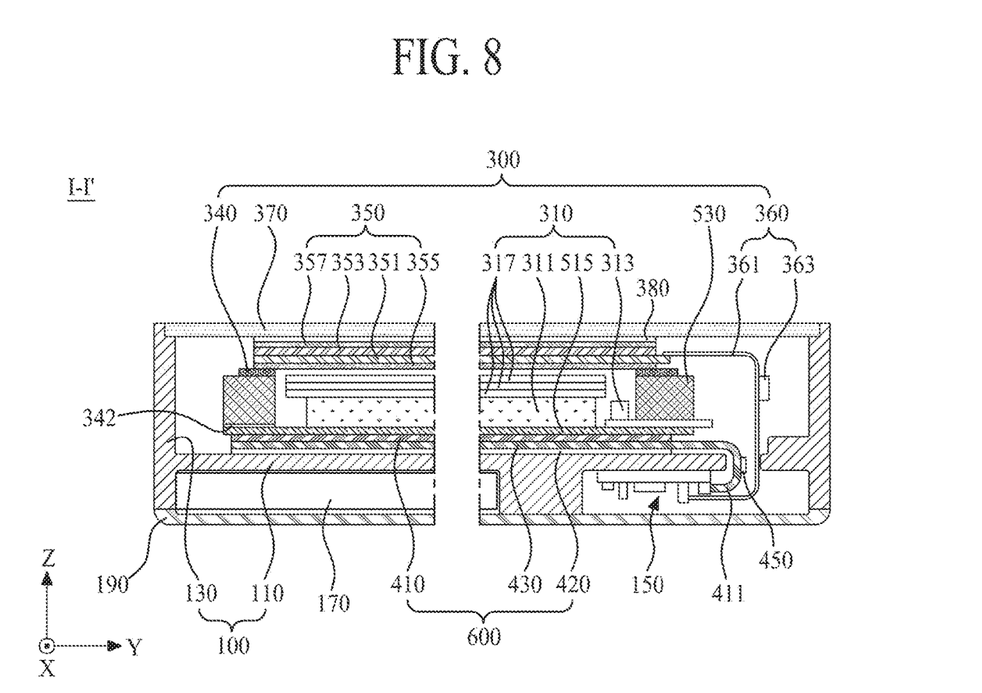
FIG. 8 illustrates an electronic device having a force touch function according to one embodiment.

FIG. 8 illustrates an electronic device having a force touch function (hereinafter, referred to as 'electronic device') according to another embodiment, which is another cross sectional view along I-I' of FIG. 2.

Referring to FIG. 8, the electronic device according to another embodiment is obtained by omitting the support cover from the electronic device according to one embodiment. Hereinafter, only structures of reflective sheet and force sensing panel, which relate to the omission of the support cover, will be described in detail. Wherever possible, the same reference numbers will be used throughout the drawings to refer to the same or like parts, and a detailed description for the same parts will be omitted.

In the electronic device according to another embodiment, a guide frame 530 is supported by a reflective sheet 515 of a backlight unit 310 so that it is possible to omit a support cover for supporting the guide frame 530, thereby realizing a light weight. Because the support cover of metal material is omitted, a housing 100 may include a metal material for radiation of heat generated in a light source 313 of the backlight unit 310, for example, aluminum (Al), invar or magnesium (Mg) material.

The reflective sheet 515 includes an expansion region for supporting a lower surface of the guide frame 530 connected with a rear edge of a liquid crystal display panel 350. The expansion region of the reflective sheet 315, which expands from each lateral side of the reflective sheet 515, is overlapped with the lower surface of the guide frame 530, and is connected with the lower surface of the guide frame 530 by the use of adhesive 342. Thus, even though the support cover is omitted, the guide frame 530 is connected with the expansion region of the reflective sheet 515. The guide frame 530 may be permanently attached to an inside of the housing 100.

A force sensing panel 600 is disposed between a bottom surface 110 of the housing 100 and an image display module 300. In more detail, the force sensing panel 600 is interposed between the bottom surface 110 of the housing 100 and the reflective sheet 515 of the backlight unit 310. The force sensing panel 600 senses a user's force touch on the electronic device.

The force sensing panel 600 serves as a heat transfer medium for transferring heat generated in the light source 313 of the backlight unit 310 to the housing 100. Thus, the force sensing panel 600 distributes a residual heat, which remains inside the electronic device, so that it is possible to prevent a picture quality from being degraded by the heat generated in the light source 313. In this case, the heat of the reflective sheet 515 may radiate toward the housing 100 along a heat transfer path via a contact portion of the force sensing panel 600 being in a physical contact with the reflective sheet 515 and the housing 100, and the heat of the reflective sheet 515 may radiate toward the housing 100 through a heat radiation of the force sensing panel 600 at the same time. Except that the force sensing panel 600 is disposed between the housing 100 and the reflective sheet 515, a structure of the force sensing panel 600 shown in FIG. 8 is the same as a structure of the force sensing panel 400 shown in FIGS. 3 and 4, whereby a detailed description for the same parts will be omitted.

If omitting the support cover, an impact-absorbing sheet of PU (polyurethane) material may be attached to the bottom surface 110 of the housing 100 so as to absorb an impact applied to the image display module 300. However, in case of the electronic device according to another embodiment, the force sensing panel 600 is disposed between the bottom surface 110 of the housing 100 and the reflective sheet 515, whereby it is possible to absorb an impact applied to the image display module 300 without implementing an additional impact-absorbing sheet.

The electronic device according to another embodiment may further include a radiation member 470 for improving radiation efficiency through the force sensing panel 600.

The radiation member 470 according to one example may be disposed between the bottom surface 110 of the housing 100 and the force sensing panel 600. For an efficient heat radiation of the reflective sheet 515, the radiation member 470 according to one example may be attached to the bottom surface 110 of the housing 100, and the force sensing panel 600. That is, a rear surface of the radiation member 470 is attached to the bottom surface 110 of the housing 100 by a first transparent adhesive 472, and a front surface of the radiation member 470 is attached to a second substrate 420 of the force sensing panel 600 by a second transparent adhesive 474. In this case, the first and second transparent adhesives 472 and 474 may be OCA (optical clear adhesive) or OCR (optical clear resin). The radiation member 470 according to one example may be a radiation sheet including a material with good heat resistance and heat radiation, for example, carbon fiber, acrylic elastomer, graphite or silicone/ceramic. Preferably, the radiation member 470 includes graphite.

The radiation member 470 according to another example may be coated onto the second substrate 420 of the force sensing panel 600 facing the bottom surface 110 of the housing 100. For an efficient heat radiation of the reflective sheet 515, the radiation member 470 according to another example may be attached to the bottom surface 110 of the housing 100. That is, the radiation member 470 according to another example is coated onto a rear surface of the second substrate 420 of the force sensing panel 600, and is then attached to the bottom surface 110 of the housing 100 by the transparent adhesive 472. The radiation member 470 according to another example may include carbon fiber, acrylic elastomer, graphite or silicone/ceramic, and a thickness of the radiation member 470 may be the same as or less than a half of a thickness of the second substrate 420.

Additionally, the housing 100 may be a central frame of the electronic device, and the central frame may support the image display module 300. In this case, the electronic device according to another embodiment may further include a rear frame (not shown) for covering various circuits disposed in a rear space of the housing 100, and a rear surface of the rear frame may be covered by the aforementioned rear cover 190.

Figure 9:
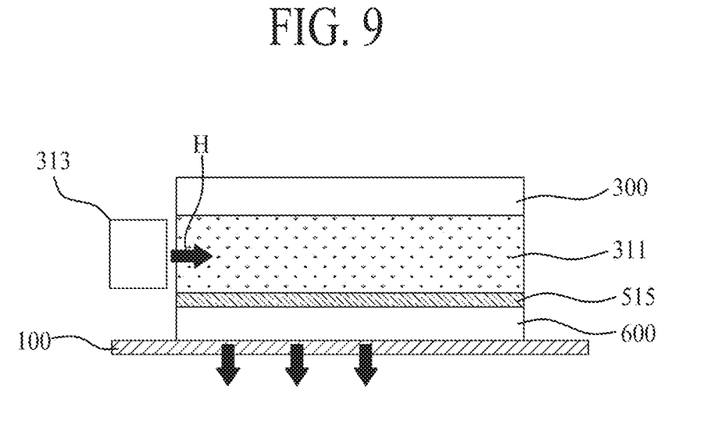
FIG. 9 illustrates a heat radiation through a force sensing panel in the electronic device according to one embodiment.

In case of the electronic device according to another embodiment, the impact applied to the image display module 300 is absorbed by the force sensing panel 600 disposed between the image display module 300 and the housing 100 so that it is possible to minimize a damage of the image display module 300 by the impact. Especially, in case of the electronic device according to another embodiment, as shown in FIG. 9, heat (H) generated in the light source 313 of the backlight unit 310 radiates toward the housing 100 through the reflective sheet 515 and the force sensing panel 600 so that it is possible to minimize a degradation of picture quality caused by deterioration of liquid crystal and wrinkles in the optical sheets 317.

In one embodiment, the image display module 300 includes the aforementioned backlight unit and the liquid crystal display panel. The aforementioned image display module may include an organic light emitting display panel. In this case, the aforementioned force sensing panel is disposed between the organic light emitting display panel and the support cover, or between the organic light emitting display panel and the housing so that heat generated in an organic light emitting device provided in each pixel of the organic light emitting display panel radiates toward the support cover or housing.

As described above, the electronic device having a force touch function according to the present disclosure is not limited to a mobile terminal, that is, a smart phone. The electronic device having a force touch function according to the embodiment may be any mobile device and mobile communication terminal having an application corresponding to a user's force touch, for example, an electronic notebook, electronic book, PMP (portable multimedia player), navigation, UMPC (ultra mobile PC), mobile phone, smart phone, smart watch, tablet PC (personal computer), watch phone, or game console.

According to the present disclosure, the force sensing panel disposed below the image display module is used as the heat transfer medium so that it is possible to improve radiation efficiency of the heat generated in the light source. Thus, it is possible to minimize a degradation of picture quality caused by deterioration of liquid crystal and wrinkles in the optical sheets.

Also, the impact is absorbed by the force sensing panel so that it is possible to prevent the image display module from being damaged by the impact.

Furthermore, the radiation member is provided in the force sensing panel, thereby improving radiation efficiency.

It will be apparent to those skilled in the art that various modifications and variations can be made to embodiments disclosed herein without departing from the scope of the present disclosure. Thus, it is intended that the present disclosure covers modifications and variations provided they come within the scope of the appended claims and their equivalents.

The invention claimed is:

1. An electronic device operable to sense a force of a user's touch, the electronic device comprising:
   a housing having a receiving space defined by a bottom surface and a sidewall;
   an image display module disposed in the receiving space, the image display module including a display panel configured to display an image; and
   a force sensing panel configured to sense a force of the touch based on a change in resistance in the force sensing panel and disposed between the bottom surface of the housing and the image display module, the force sensing panel entirely below the display panel, wherein the force sensing panel is in contact with the bottom surface of the housing and the image display module, and configured to radiate heat from the image display module to the housing.

2. The electronic device according to claim 1, wherein the force sensing panel includes a force sensor whose resistance value is arranged to change in accordance with the force of the user's touch, wherein the force sensor is provided between a plurality of first electrodes and a plurality of second electrodes facing each other.

3. The electronic device according to claim 2, wherein the force sensing panel includes:
   a first substrate upon which the plurality of first electrodes are disposed;
   a second substrate upon which the plurality of second electrodes are disposed;
   a plurality of first elastic resistor members, each of the plurality of first elastic resistor members covering and in contact with a corresponding one of the plurality of first electrodes;
   a plurality of second elastic resistor members, each of the plurality of second elastic resistor members covering and in contact with a corresponding one of the plurality of second electrodes;
   a substrate attachment member attaching the first substrate and the second substrate to each other with a gap provided between the first substrate and the second substrate,
   wherein at least a portion of the plurality of first elastic resistor members and the plurality of second elastic resistor members are disposed between the plurality of first electrodes and the plurality of second electrodes.

4. The electronic device according to claim 3, further comprising a radiation member disposed between the bottom surface of the housing and the force sensing panel.

5. The electronic device according to claim 4, wherein a rear surface of the radiation member is attached to the bottom surface of the housing and a front surface of the radiation member is attached to a rear surface of the second substrate facing the bottom surface of the housing.

6. The electronic device according to claim 4, wherein the radiation member is coated onto a rear surface of the second substrate facing the bottom surface of the housing and is attached to the bottom surface of the housing.

7. The electronic device according to claim 3, further comprising a support cover received in the receiving space, wherein the support cover includes a support plate for supporting the force sensing panel.

8. The electronic device according to claim 7, further comprising a radiation member disposed between the support plate of the support cover and the force sensing panel.

9. The electronic device according to claim 8, wherein a rear surface of the radiation member is attached to the support plate of the support cover and a front surface of the radiation member is attached to a rear surface of the second substrate.

10. The electronic device according to claim 8, wherein the radiation member is coated onto a rear surface of the second substrate facing the support plate of the support cover and is attached to the support plate of the support cover.

11. The electronic device according to claim 4, wherein the radiation member includes graphite.

12. The electronic device according to claim 2, wherein the force sensing panel further includes a spacer disposed between the first and second electrodes.

13. The electronic device according to claim 2, wherein the image display module includes:
   a backlight unit provided on the force sensing panel;
   wherein the display panel is a liquid crystal display panel provided on the backlight unit; and
   a cover window for covering the liquid crystal display panel, the cover window being supported by the sidewall of the housing.

14. The electronic device according to claim 13, wherein the backlight unit includes:
   a light guiding plate having a light-incidence portion;
   a light source for emitting light to the light-incidence portion;
   a reflective sheet disposed between the light guiding plate and the force sensing panel; and
   optical sheets provided on the light guiding plate.

* * * * *